United States Patent [19]

Hasegawa

[11] Patent Number: 5,694,910
[45] Date of Patent: Dec. 9, 1997

[54] APPARATUS FOR CONTROLLING AIR-FUEL RATIO OF INTERNAL COMBUSTION ENGINE

[75] Inventor: Yusuke Hasegawa, Wako, Japan

[73] Assignee: Honda Giken Kogyo Kabushiki Kaisha, Tokyo, Japan

[21] Appl. No.: 596,566

[22] Filed: Feb. 5, 1996

[30] Foreign Application Priority Data

Feb. 24, 1995 [JP] Japan ............................ 37091/7 Heisei

[51] Int. Cl.$^6$ .................................................. F02D 41/14
[52] U.S. Cl. ............................ 123/674; 123/684; 60/276
[58] Field of Search .............................. 123/672, 673, 123/674, 675, 694; 60/276, 285; 364/431.05

[56] References Cited

U.S. PATENT DOCUMENTS

| | | | |
|---|---|---|---|
| 4,934,328 | 6/1990 | Ishii et al. | 123/673 |
| 5,020,502 | 6/1991 | Wild | 123/673 |
| 5,117,631 | 6/1992 | Moser | 123/674 |
| 5,442,270 | 8/1995 | Tetsuaki | 318/568.22 |
| 5,462,037 | 10/1995 | Hasegawa et al. | 123/673 |
| 5,535,135 | 7/1996 | Bush et al. | 123/672 |
| 5,546,916 | 8/1996 | Sudholt et al. | 123/674 |
| 5,548,514 | 8/1996 | Hasegawa et al. | 123/673 |
| 5,566,071 | 10/1996 | Akazaki et al. | 123/673 |

FOREIGN PATENT DOCUMENTS

| | | |
|---|---|---|
| 4-224425 | 8/1992 | Japan. |
| 5-180040 | 7/1993 | Japan. |
| 5-216504 | 8/1993 | Japan. |

OTHER PUBLICATIONS

Journal of Dynamic Systems, Measurement, and Control, vol. 115, Sep. 1993, Cho et al, "Variable Structure Control Method for Fuel-Injected Systems", pp. 475–481.

*Primary Examiner*—Willis R. Wolfe
*Attorney, Agent, or Firm*—Nikaido, Marmelstein, Murray & Oram LLP

[57] ABSTRACT

An apparatus for controlling the air-fuel ratio of an internal combustion engine has an air-fuel ratio sensor for detecting an air-fuel ratio of the internal combustion engine, and a fuel supply control device for controlling an amount of fuel supplied to the internal combustion engine based on the air-fuel ratio detected by the air-fuel ratio sensor. The fuel supply control device has a feedback control system for controlling the amount of fuel supplied to the internal combustion engine through a feedback control loop according to a sliding mode control process in order to equalize the detected air-fuel ratio with a target air-fuel ratio.

8 Claims, 6 Drawing Sheets

APPARATUS FOR CONTROLLING AIR-FUEL RATIO OF INTERNAL COMBUSTION ENGINE

BACKGROUND OF THE INVENTION

1. Field of the Invention

The present invention relates to an apparatus for controlling the air-fuel ratio of an internal combustion engine.

2. Description of the Related Art

There have heretofore been known apparatus for controlling the air-fuel ratio of internal combustion engines of automobiles to purify exhaust gases as much as possible or produce output power efficiently.

The conventional apparatus for controlling the air-fuel ratio of internal combustion engines have an air-fuel ratio detecting means connected to the exhaust pipe of the engine for detecting an actual air-fuel ratio from moment to moment, and a control means for controlling the amount of fuel supplied to the engine with a feedback loop based on a PID (proportional plus integral plus derivative) control process or the like in order to equalize the detected air-fuel ratio with a target value that has been established as an adequate air-fuel ratio. It has also been proposed to associate a single air-fuel ratio detecting means with an exhaust manifold extending from the cylinders of a multicylinder engine, estimate actual air-fuel ratios of the respective cylinders from the detected air-fuel ratio using an observer, and control the air-fuel ratios of the respective cylinders with a feedback loop based on the detected air-fuel ratio (see Japanese laid-open patent publication No. 5-180040 and Japanese patent application No. 6-340021).

In the conventional apparatus for controlling the air-fuel ratio of internal combustion engines according to the PID control process, it is necessary to establish a feedback gain in advance in view of changes in characteristics such as a response delay, etc. of the fuel supply device of the engine, the air-fuel ratio detecting means, and the like.

Specifically, characteristics such as a response delay, etc. of the fuel supply device and the air-fuel ratio detecting means generally change due to aging and the manner in which the engine is used. For example, the response delay tends to increase due to aging.

If the feedback gain were established based on an initial response delay of the fuel supply device and the air-fuel ratio detecting means, then when the response delay has increased due to aging, the initially established response delay would become excessively large with respect to the increased response delay. As a result, the air-fuel ratio controlled by the apparatus would suffer hunting, and would not stably converge toward the target value, with the result that the exhaust gases emitted from the engine would not sufficiently be purified.

Especially when the air-fuel ratio is controlled based on an air-fuel ratio detected by the air-fuel ratio detecting means located downstream of a catalytic converter, the above problem is likely to arise because the response delay of the catalytic converter is subject to a large variation owing to aging.

In view of such characteristic changes of the fuel supply device of the engine, the air-fuel ratio detecting means, and the catalytic converter in the conventional air-fuel ratio controlling apparatus, it has been necessary to set the feedback gain to a relatively low gain. The feedback gain has to be set to a considerably low gain particularly in the case where the air-fuel ratio detecting means is located downstream of the catalytic converter.

With the feedback gain set to a low gain, however, the controlled air-fuel ratio cannot quickly converge toward the target value, and, therefore, it is difficult to control the air-fuel ratio accurately from moment to moment.

In the case where the air-fuel ratios of the cylinders of the multicylinder engine are estimated using the observer, when errors of the estimated air-fuel ratios of the cylinders increase due to a change in the response delay of the air-fuel ratio detecting means, the process of controlling the air-fuel ratio is liable to become unstable inasmuch as the air-fuel ratio is controlled with a constant gain regardless of the errors of the estimated air-fuel ratios in the conventional air-fuel ratio controlling apparatus according to the PID control process.

In the fields of robot control and constant-speed control processes, it has been proposed in recent years to improve the ability to converge an object to be controlled toward a target value according to a sliding mode control process as disclosed in Japanese laid-open patent publications Nos. 5-216504 (U.S. Pat. No. 5,442,270) and 4-224425, for example.

SUMMARY OF THE INVENTION

It is therefore an object of the present invention to provide an apparatus for controlling the air-fuel ratio of an internal combustion engine to converge stably and quickly toward a target value irrespective of variations in response characteristics of an air-fuel ratio detecting means, a fuel supply device, etc.

To achieve the above object, there is provided in accordance with the present invention an apparatus for controlling the air-fuel ratio of an internal combustion engine, comprising air-fuel ratio detecting means for detecting an air-fuel ratio of the internal combustion engine, and fuel supply control means for controlling an amount of fuel supplied to the internal combustion engine based on the air-fuel ratio detected by the air-fuel ratio detecting means, the fuel supply control means comprising feedback control means for controlling the amount of fuel supplied to the internal combustion engine through a feedback control loop according to a sliding mode control process in order to equalize the detected air-fuel ratio with a target air-fuel ratio.

The sliding mode control process carried out by the feedback control means switches feedback gains in order to lead states of various parts of a system of the internal combustion engine including the air-fuel ratio detecting means onto a hyperplane determined on state spaces, thus stabilizing the states, depending on those states, and is less susceptible to changes in characteristics, such as a response delay, of the air-fuel ratio detecting means, etc. According to the present invention, since the amount of fuel supplied to the internal combustion engine is controlled through the feedback control loop according to the sliding mode control process in order to equalize the detected air-fuel ratio with the target air-fuel ratio, the air-fuel ratio can stably be converged toward the target air-fuel ratio irrespective of changes in characteristics, such as a response delay, of the air-fuel ratio detecting means, etc. Because the sliding mode control process is less susceptible to changes in characteristics, such as a response delay, of the air-fuel ratio detecting means, etc., it is possible to adjust the feedback gain of the feedback control means for a capability to converge the air-fuel ratio quickly.

Therefore, even when response characteristics or the like of a fuel supply device of the internal combustion engine and the air-fuel ratio detecting means change due to aging, the detected air-fuel ratio can be controlled so as to converge stably toward the target air-fuel ratio. Because of the stable converging capability, the air-fuel ratio of the internal combustion engine can quickly be converged toward the target air-fuel ratio by establishing an appropriate feedback gain for the sliding mode control process.

The feedback control means controls the amount of fuel supplied to the internal combustion engine through the feedback control loop by correcting an amount of fuel to be supplied to the internal combustion, which is determined depending on at least a rotational speed and an intake air pressure of the internal combustion engine, according to the sliding mode control process in order to equalize the detected air-fuel ratio with the target air-fuel ratio.

If a catalytic converter is associated with an exhaust system of the internal combustion engine for purifying exhaust gases emitted from the internal combustion engine, then the air-fuel ratio detecting means should preferably be positioned downstream of the catalytic converter. While the catalytic converter has response characteristics that can easily change, the air-fuel ratio downstream of the catalytic converter can be controlled so as to converge stably toward the target air-fuel ratio irrespective of characteristic changes of the catalytic converter. Consequently, the exhaust gases emitted from the internal combustion engine can reliably be purified.

In the case where the air-fuel ratio detecting means is positioned downstream of the catalytic converter, the apparatus may further comprise second air-fuel ratio detecting means positioned upstream of the catalytic converter, the feedback control means comprising first feedback control means for determining a target air-fuel ratio upstream of the catalytic converter according to the sliding mode control process depending on an air-fuel ratio detected by the air-fuel ratio detecting means positioned downstream of the catalytic converter, and second feedback control means for controlling the amount of fuel supplied to the internal combustion engine through the feedback control loop in order to equalize an air-fuel ratio detected by the second air-fuel ratio detecting means positioned upstream of the catalytic converter with the target air-fuel ratio upstream of the catalytic converter which is determined by the first feedback control means.

With such an arrangement, the air-fuel ratio downstream of the catalytic converter is controlled so as to converge stably toward the target air-fuel ratio according to the sliding control mode process, and the air-fuel ratio upstream of the catalytic converter is controlled by the second feedback control means so as to converge toward the target air-fuel ratio that is determined so as to correspond to the air-fuel ratio downstream of the catalytic converter by the first feedback control means. The air-fuel ratio of the internal combustion engine can thus be controlled highly accurately.

The first feedback control means determined the target air-fuel ratio upstream of the catalytic converter by correcting a reference target air-fuel ratio upstream of the catalytic converter according to the sliding mode control process in order to equalize the air-fuel ratio detected by the air-fuel ratio detecting means positioned downstream of the catalytic converter with a target air-fuel ratio downstream of the catalytic converter.

With the first and second feedback control means being employed, the amount of fuel supplied to the internal combustion engine is controlled through the feedback loop according to the sliding mode control process by the second feedback control means, so that the air-fuel ratio upstream of the catalytic converter can stably be controlled. Consequently, the air-fuel ratio in an exhaust system of the internal combustion engine can reliably be controlled so as to converge stably toward the target air-fuel ratio highly accurately.

The amount of fuel supplied to the internal combustion engine may be controlled through the feedback loop by the first feedback control means by correcting the amount of fuel to be supplied to the internal combustion, which is determined depending on at least a rotational speed and an intake air pressure of the internal combustion engine, according to the sliding mode control process in order to equalize the detected air-fuel ratio with the target air-fuel ratio.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

An apparatus for controlling the air-fuel ratio of an internal combustion engine according to a first embodiment of the present invention will be described below with reference to FIGS. 1 through FIGS. 4(a) and 4(b).

Figure 1:
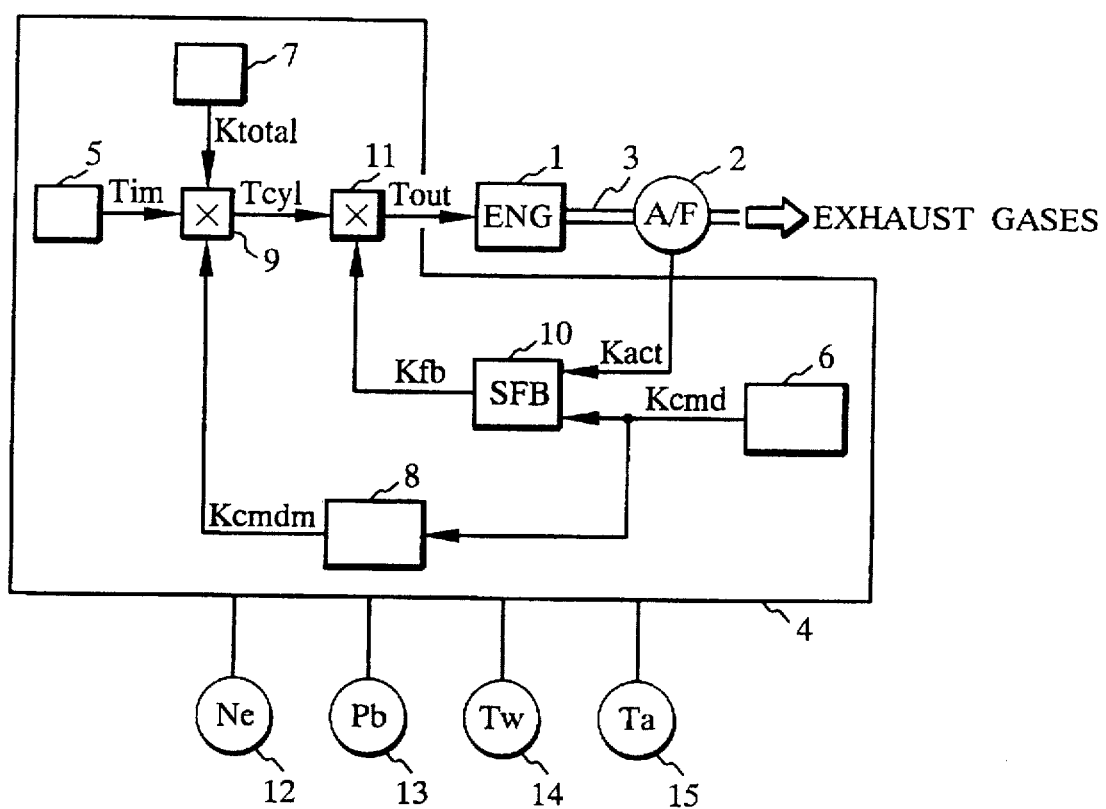
FIG. 1 is a block diagram of an apparatus for controlling the air-fuel ratio of an internal combustion engine according to a first embodiment of the present invention.

As shown in FIG. 1, an internal combustion engine 1 has an exhaust pipe 3 associated with an air-fuel ratio sensor (an air-fuel ratio detecting means) 2. The air-fuel ratio sensor 2 supplies a signal representative of a detected air-fuel ratio to a fuel supply control device (a fuel supply control means) 4 which controls the amount of fuel supplied to the engine 1.

The fuel supply control device 4, which is typically implemented by a microcomputer, comprises, as its functional units, a basic amount-of-fuel calculating unit 5 for calculating a basic amount Tim of fuel, which serves as a reference amount of fuel to be supplied to the engine 1, based on a rotational speed Ne and an intake air pressure Pb of the engine 1, a target air-fuel-ratio calculating unit 6 for calculating a target air-fuel ratio Kcmd for the engine 1 based on a coolant temperature Tw, the rotational speed Ne, and the intake air pressure Pb of the engine 1, a first corrective coefficient calculating unit 7 for calculating a first corrective coefficient Ktotal to correct the basic amount Tim of fuel based on the coolant temperature Twand an intake air temperature Ta of the engine 1, a second corrective coefficient calculating unit 8 for calculating a second corrective coefficient Kcmdm to correct the basic amount Tim of fuel based on the target air-fuel ratio Kcmd, a first multiplier 9 for multiplying the basic amount Tim of fuel by the first and second corrective coefficients Ktotal, Kcmdm to determine a requested amount Tcyl of fuel, a feedback control unit (feedback control means) 10 for determining, according to sliding mode control rules, a feedback corrective coefficient Kfb to correct the requested amount Tcyl of fuel in order to eliminate any difference between an actual air-fuel ratio Kact detected by the air-fuel ratio sensor 2 and the target air-fuel ratio Kcmd, i.e., to equalize the detected air-fuel ratio Kact with the target air-fuel ratio Kcmd, from the detected air-fuel ratio Kact and the target air-fuel ratio Kcmd, and a second multiplier 11 for multiplying the requested amount Tcyl of fuel by the feedback corrective coefficient Kfb to determine an output amount Tout of fuel which will actually be supplied to the engine 1. The fuel supply control device 4 indicates the output amount Tout of fuel finally produced by the second multiplier 11 to a fuel supply device (not shown) of the engine 1 to inject the indicated amount of fuel into the engine 1.

To the fuel supply control device 4, there are connected a sensor 12 for detecting the rotational speed Ne of the engine 1, a sensor 13 for detecting the intake air pressure Pb of the engine 1, a sensor 14 for detecting the coolant temperature Tw of the engine 1, and a sensor 15 for detecting the intake air temperature Ta of the engine 1. The basic amount-of-fuel calculating unit 5, the target air-fuel-ratio calculating unit 6, and the first corrective coefficient calculating unit 7 calculate the basic amount Tim of fuel, the target air-fuel ratio Kcmd, and the first corrective coefficient Ktotal, respectively, using given maps or tables based on the rotational speed Ne, the intake air pressure Pb, the coolant temperature Tw, the intake air temperature Ta from the sensors 12-15.

Each of the detected air-fuel ratio Kact and the target air-fuel ratio Kcmd that are given to the feedback control unit 10 is actually supplied as an equivalent ratio (=stoichiometric air-fuel ratio/actual air-fuel ratio=1/λ, λ: excess air factor). The second corrective coefficient Kcmdm calculated by the second corrective coefficient calculating unit 8 serves to correct the basic amount Tim of fuel in view of the fact that the intake air charging efficiency varies due to the heat of evaporation of the fuel depending on the air-fuel ratio of the engine 1. The second corrective coefficient calculating unit 8 determines the second corrective coefficient Kcmdm by correcting the target air-fuel ratio Kcmd represented by an equivalent ratio according to a given map or calculations.

Figure 3:
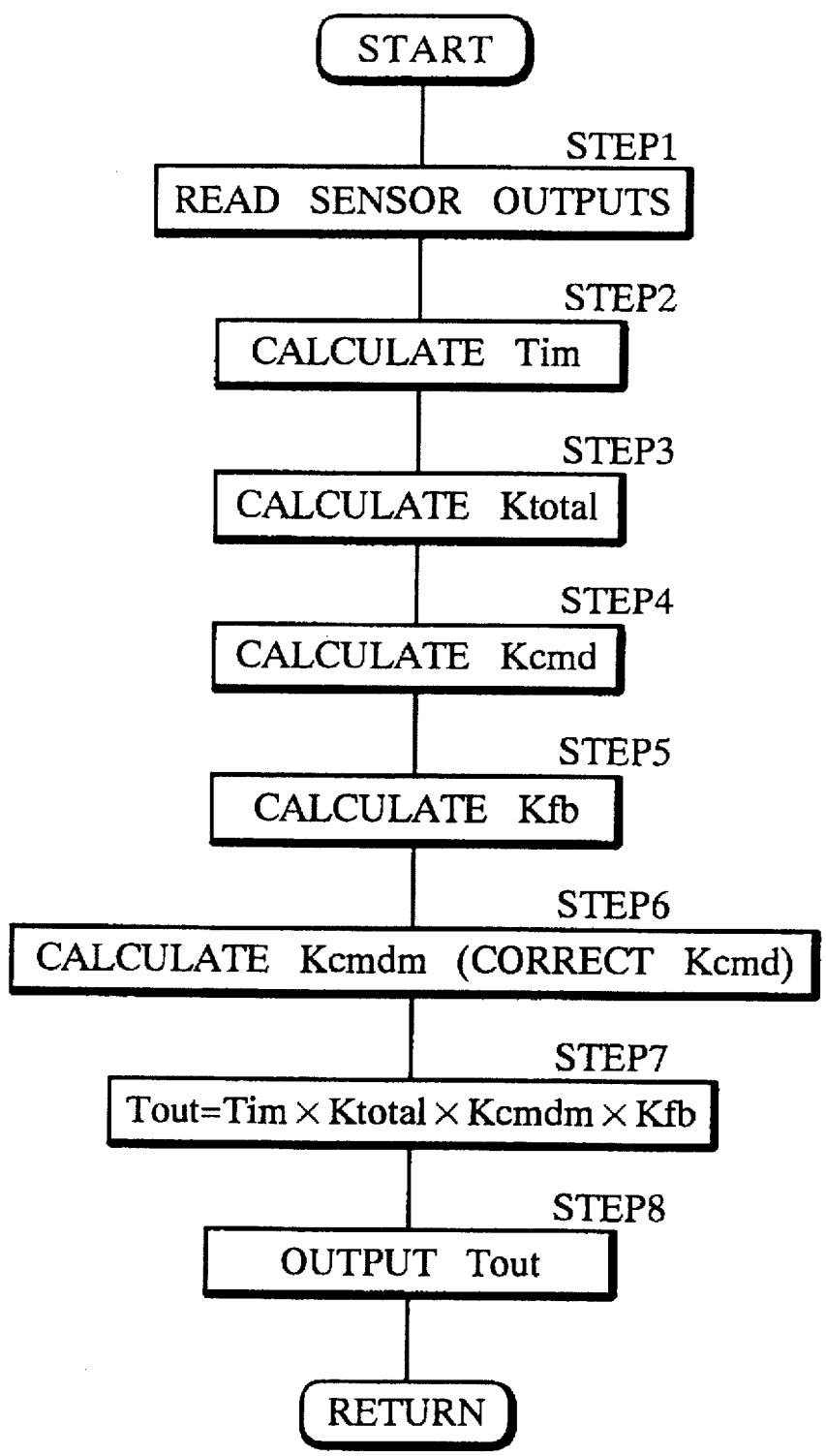
FIG. 3 is a flowchart of an operation sequence of the apparatus shown in FIG. 1.

The apparatus shown in FIG. 1 operates in cyclic periods according to an operation sequence shown in FIG. 3 for controlling the air-fuel ratio of the internal combustion engine 1.

As shown in FIG. 3, the fuel supply control device 4 reads detected output signals from the sensors 12-15 in a step 1, and the basic amount-of-fuel calculating unit 5, the target air-fuel-ratio calculating unit 6, and the first corrective coefficient calculating unit 7 calculate a basic amount Tim of fuel, a target air-fuel ratio Kcmd, and a first corrective coefficient Ktotal, respectively, based on the detected output signals in respective steps 2, 3, 4.

The feedback control unit 10 then determines, according to sliding mode control rules, a feedback corrective coefficient Kfb in order to eliminate any difference between an actual air-fuel ratio Kact detected by the air-fuel ratio sensor 2 and the target air-fuel ratio Kcmd, from the detected air-fuel ratio Kact and the target air-fuel ratio Kcmd, in a step 5. The second corrective coefficient calculating unit 8 determines a second corrective coefficient Kcmdm in a step 6. The first and second multipliers 9, 11 multiply the basic amount Tim of fuel by the first and second corrective coefficients Ktotal, Kcmdm and the feed-back corrective coefficient Kfb to determine an output amount Tout of fuel in a step 7. The output amount Tout of fuel thus determined is given as a command value to the non-illustrated fuel supply device in a step 8, and the fuel supply device supplies the indicated amount of fuel to the engine 1.

The air-fuel ratio of the engine 1 is thus controlled to equalize the detected air-fuel ratio Kact with the target air-fuel ratio Kcmd.

A process of calculating the feedback corrective coefficient Kfb with the feedback control unit 10 will be described below.

Figure 2A:
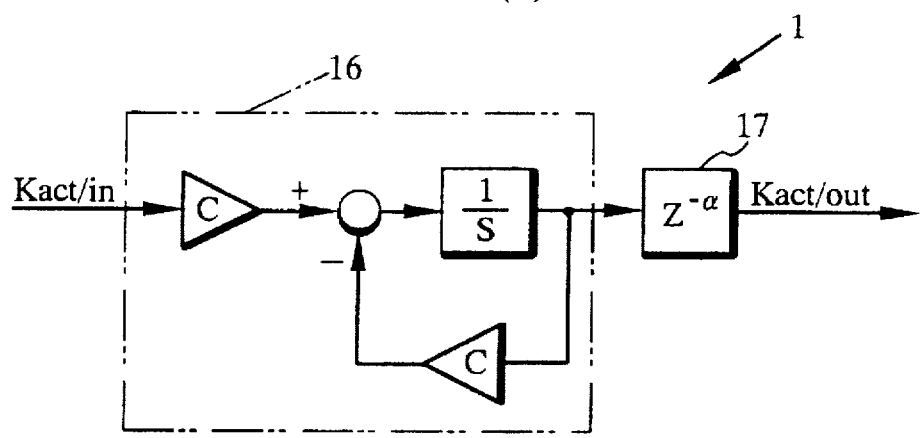
FIG. 2(a) is a block diagram of a continuous system of a model of the internal combustion engine whose air-fuel ratio is controlled by the apparatus shown in FIG. 1.

In this embodiment, the engine 1 together with the non-illustrated fuel supply device and the air-fuel ratio sensor 2 is modeled as an engine plant which comprises, as shown in FIG. 2(a), a time-lag-of-first-order generator 16 based on the response delay of the fuel supply device, the detecting response delay of the air-fuel ratio sensor 2, etc., and a waste-time generator 17 based on the period of time required to determine the corrective coefficient Ktotal, etc. In FIG. 2(a), the engine plant is represented by the reference numeral 1 which is used to indicate the internal combustion engine in FIG. 1. In FIG. 2(a), the engine plant 1 is expressed as a plant for being supplied with an input value Kact/in for the air-fuel ratio (hereinafter referred to as an "input air-fuel ratio Kact/in") and outputting an output value Kact/out for the air-fuel ratio (hereinafter referred to as an "output air-fuel ratio Kact/out"). The input air-fuel ratio Kact/in corresponds to the output amount Tout of fuel in FIG. 1, and the output air-fuel ratio Kact/out to the detected air-fuel ratio Kact outputted from the air-fuel ratio sensor 2 in FIG. 1.

Figure 2B:
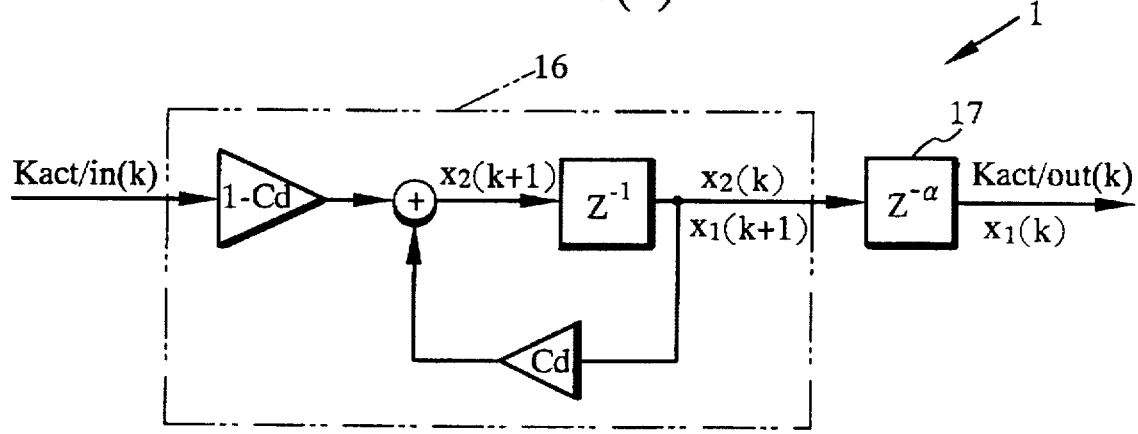
FIG. 2(b) is a block diagram of a discrete system of the model of the internal combustion engine shown in FIG. 2(a)

For microcomputer-control of the air-fuel ratio, the engine plant 1 shown in FIG. 2(a) may be represented by a discrete system as shown in FIG. 2(b). In FIG. 2(b), "Cd" is expressed by the following equation (1), using the gain C of the time-lag-of-first-order generator 16 in the continuous system shown in FIG. 2(a):

$$Cd = 1 + C\Delta T + \frac{C^2 \Delta T^2}{2!} + \frac{C^3 \Delta T^3}{3!} + \frac{C^4 \Delta T^4}{4!} \quad (1)$$

If state quantities in the engine plant 1 in FIG. 2(a) are defined as $x_1(k)$, $x_1(k+1)$, $x_2(k)$, $x_2(k+1)$ (where k, k+1 represent kth and (k+1)th cycles) as shown in FIG. 2(b), then state equations of the engine plant 1 are expressed by the following equation (2), (3) or (4), (5), using matrix representations:

$$\begin{cases} \begin{bmatrix} x_1 \\ x_2 \end{bmatrix}_{(k+1)} = \begin{bmatrix} 0 & 1 \\ 0 & Cd \end{bmatrix} \begin{bmatrix} x_1 \\ x_2 \end{bmatrix}_{(k)} + \begin{bmatrix} 0 \\ 1 \end{bmatrix} -Cd \end{bmatrix} Kact/in_{(k)} \quad (2) \\ \\ Kact/out_{(k+1)} = \begin{bmatrix} 1 & 0 \end{bmatrix} \begin{bmatrix} x_1 \\ x_2 \end{bmatrix}_{(k)} \quad (3) \end{cases}$$

-continued $$\begin{cases} x_{(k+1)} = AX_{(k)} + BU_{(k)} & (4) \\ Y_{(k)} = DX_{(k)} & (5) \end{cases}$$

where $$X = \begin{bmatrix} x_1 \\ x_2 \end{bmatrix}, A = \begin{bmatrix} 0 & 1 \\ 0 & Cd \end{bmatrix}$$

$$B = \begin{bmatrix} 0 \\ 1 & -Cd \end{bmatrix}, D = [1 \ 0]$$

$U = Kact/in, Y = Kact/out.$

According to the sliding mode control theory, if a matrix S is defined such that a matrix M expressed by the following equation (6) is regular and also if the equation $\sigma(k)=SX(k)$ is defined, then it is possible to stably restrain state quantities $x_1, x_2$ of the engine plant 1 on a hyperplane expressed by the equation $\sigma(k)=SX(k)=0$ (in this case, the hyperplane is a straight line because there are two state quantities) and to smoothly converge the state quantities $x_1, x_2$ toward an equilibrium point on the hyperplane (in this case, the equilibrium point is a point where $x_1=x_2=0$).

$$M = A - B(SB)^{-1}S(A-I) \quad (6)$$

More specifically, when "Cd" in FIG. 2(b) is given as 0.6, for example, then if $$S = [0.1 \ 0.3]$$

is defined, the matrix M expressed by the following equation (6) is regular, and the equation:

$$\sigma(k) = SX(k) = 0.1x_1(k) + 0.3x_2(k)$$

is satisfied.

According to the sliding mode control theory, if the matrix S and $\sigma(k)$ are defined above, then the state quantities $x_1, x_2$ of the engine plant 1 are converged toward and stabilized on the equilibrium point on the hyperplane when U(k) (=Kact/in(k)) expressed by the following equation (7) is given as an input air-fuel ratio to the engine plant (1):

$$U(k) = -(SB)^{-1}S(A-I)X(k) - \left\{ \eta \frac{|\sigma(k)|}{|SB|} + \beta \right\} sgn\{\sigma(k)\} \quad (7)$$

where I is a unit matrix, $\eta$, $\beta$ are suitable constants for adjusting the degree of convergence, and $sgn\{\sigma(k)\}$ is a signum function which is +1 when $\sigma(k)>0$ (the state quantities $x_1, x_2$ are above the hyperplane) and −1 when $\sigma(k)<0$ (the state quantities $x_1, x_2$ are below the hyperplane).

Based on the foregoing analysis, the feedback control unit 10 calculates the feedback corrective coefficient Kfb as follows:

The feedback control unit 10 corrects the amount of fuel supplied (the amount of fuel injected) to the engine 1 so that the detected air-fuel ratio Kact from the air-fuel sensor 2 will be equalized with the target air-fuel ratio Kcmd, i.e., any difference between the detected air-fuel ratio Kact and the target air-fuel ratio Kcmd will be converged to a value "0". For correcting the amount of fuel supplied to the engine 1, the feedback control unit 10 determines the feedback corrective coefficient Kfb by which to multiply the requested amount Tcyl of fuel (see FIG. 1) to correct the same.

The state quantities $x_1, x_2$ of the engine plant 1 shown in FIG. 2(b) are representative of the air-fuel ratio itself. When the value U(k) (=Kact/in(k)) determined according to the equation (7) is inputted as it is to the engine plant 1, it finally converges the state quantities $x_1, x_2$ toward the equilibrium point, which is a point where $x_1=x_2=0$, on the hyperplane.

According to this embodiment, actually, the state quantities $x_1, x_2$ in the equation (7) are replaced with differences $(x_1-Kcmd), (x_2-Kcmd)$ between themselves and the target air-fuel ratio Kcmd to determine U(k) with overbar as indicated by the following equation (8), and the feedback corrective coefficient Kfb is determined by adding 1 to the U(k) with overbar according to the following equation (9):

$$\overline{U}(k) = -(SB)^{-1}S(A-I)\overline{X}(k) - \left\{ \eta \frac{|\overline{\sigma}(k)|}{|SB|} + \beta \right\} sgn\{\overline{\sigma}(k)\} \quad (8)$$

where $$\overline{X}(k) = \begin{bmatrix} x_1 - Kcmd \\ x_2 - Kcmd \end{bmatrix} \quad (9)$$

$$\overline{\sigma}(k) = S\overline{X}(k)$$

$$Kfb = \overline{U}(k) + 1$$

The U(k) with overbar in the feedback corrective coefficient Kfb determined according to the equation (9) represents a feedback control quantity for converging the differences $x_1, x_2$ with overbar between the state quantities $x_1, x_2$ and the target air-fuel ratio Kcmd toward 0, i.e., for equalizing the detected air-fuel ratio Kact $(=x_1(k))$ with the target air-fuel ratio Kcmd. When the detected air-fuel ratio Kact is finally converged upon the target air-fuel ratio Kcmd, the U(k) with overbar becomes nil (=0), and the feedback corrective coefficient Kfb becomes 1, so that the requested amount Tcyl of fuel (see FIG. 1) is given as the output amount Tout of fuel, which is a final value indicative of the amount of fuel to be injected into the engine 1, to the fuel supply device (not shown) of the engine 1.

The feedback control unit 10 thus controls the air-fuel ratio of the engine 1 according to a sliding mode control process in order to equalize the air-fuel ratio Kact of the engine 1 detected by the air-fuel ratio sensor 2 with the target air-fuel ratio Kcmd.

In order to determine the U(k) with overbar according to the equation (8) which is required to determine the feedback corrective coefficient Kfb according to the equation (9), it is necessary to recognize the state quantity $x_2$ in addition to the state quantity $x_1$ which is representative of the detected air-fuel ratio Kact. Since the state quantity $x_2$ is a hypothetical state quantity defined on the model of the engine plant 1 as shown in FIGS. 2(a) and 2(b), it is difficult to directly detect the state quantity $x_2$.

According to this embodiment, an internal condition of the engine plant 1 based on the model as shown in FIGS. 2(a) and 2(b) is observed with an observer proposed in Japanese laid-open patent publication No. 5-180040 and Japanese patent application No. 6-340021, and the state quantity $x_2$ is estimated back from the detected air-fuel ratio Kact based on the model as shown in FIGS. 2(a) and 2(b).

Specifically, in the model of the engine plant 1 as shown in FIGS. 2(a) and 2(b), the following equation (10) is obtained from the equation (2) described above:

$$x_2(k+1)=Cd\cdot x_2(k)+(1-Cd)\cdot Kact/in(k)=Cd\cdot x_1(k+1)+(1-Cd)\cdot Kact/in(k) \quad (10)$$

Therefore, the state quantity $x_2$ can be estimated according to the equation (10) from the present the state quantity $x_1$ (=the detected air-fuel ratio Kact) and the input air-fuel ratio Kact/in in a present control cycle time (which corresponds to the output amount Tout of fuel in a previous control cycle time).

In this embodiment, the equations (8), (9) are calculated using the state quantity $x_2$ which is estimated from the detected air-fuel ratio Kact, for thereby determining the feedback corrective coefficient Kfb.

The apparatus for controlling the air-fuel ratio of the engine 1 according to the sliding mode control process in this embodiment makes it possible to control the air-fuel ratio so as to reach the target air-fuel ratio Kcmd even when the response characteristics of the fuel supply device (not shown) of the engine 1, the air-fuel ratio sensor, etc. vary due to aging.

Specifically, according to the sliding mode control process, basically, when the state quantities $x_1$, $x_2$ are restrained on the hyperspace which is represented by the equation $\sigma(k)=SX(k)=0$, the state quantities $x_1$, $x_2$ can be converged toward the equilibrium point on the hyperspace. For controlling the air-fuel ratio of the engine 1, therefore, the state quantities $x_1$, $x_2$ may basically be controlled so as to be directed onto the hyperplane. The state quantities $x_1$, $x_2$ are controlled by the second term, including the signum function sgn $\{\sigma(k)\}$, on the right-hand side of the equation (7). The second term changes its sign depending on whether $\sigma(k)$ is positive or negative, i.e., whether the state quantities $x_1$, $x_2$ are above or below the hyperplane, for thereby directing the state quantities $x_1$, $x_2$ onto the hyperplane.

In the apparatus for controlling the air-fuel ratio of the engine 1 according to the sliding mode control process in this embodiment, the state quantities $x_1$, $x_2$ can stably be converged toward the equilibrium point on the hyperspace insofar as they are restrained on the hyperspace even when the response characteristics of the fuel supply device (not shown) of the engine 1, the air-fuel ratio sensor, etc. vary due to aging, thereby changing the value "Cd" of the engine plant 1 shown in FIGS. 2(a) and 2(b). This holds true even when an error of the estimated state quantity $x_2$ increases owing to aging of the air-fuel sensor 2, etc.

It is possible to quickly converge the state quantities $x_1$, $x_2$ onto the hyperplane by suitably establishing $\eta$, $\beta$ in the equation (7) or (8) for thereby increasing the ability to converge toward the target air-fuel ratio Kcmd while controlling the air-fuel ratio stably.

Simulations that were carried out by the inventor with respect to the apparatus according to this embodiment will be described below. The inventor set the value "Cd" in the engine plant 1 modeled as shown in FIG. 2(b) to 0.6, for example, (at this time, S=[0.1 0.3]), and simulated the ability to converge the detected air-fuel ratio Kact from its initial value of 1.5 as an equivalent ratio toward the target air-fuel ratio Kcmd of 1.0, using the feedback corrective coefficient Kfb determined by the equation (9). In the equation (9), $\eta$, $\beta$ had respective values of 1, 0. The result of the simulation is indicated by the solid-line curve in FIG. 4(a). A similar simulation was also effected on the conventional PID control apparatus disclosed in Japanese patent application No. 6-340021. The result of the simulation on the conventional PID control apparatus is indicated by the broken-line curve in FIG. 4(a).

Figure 4A:
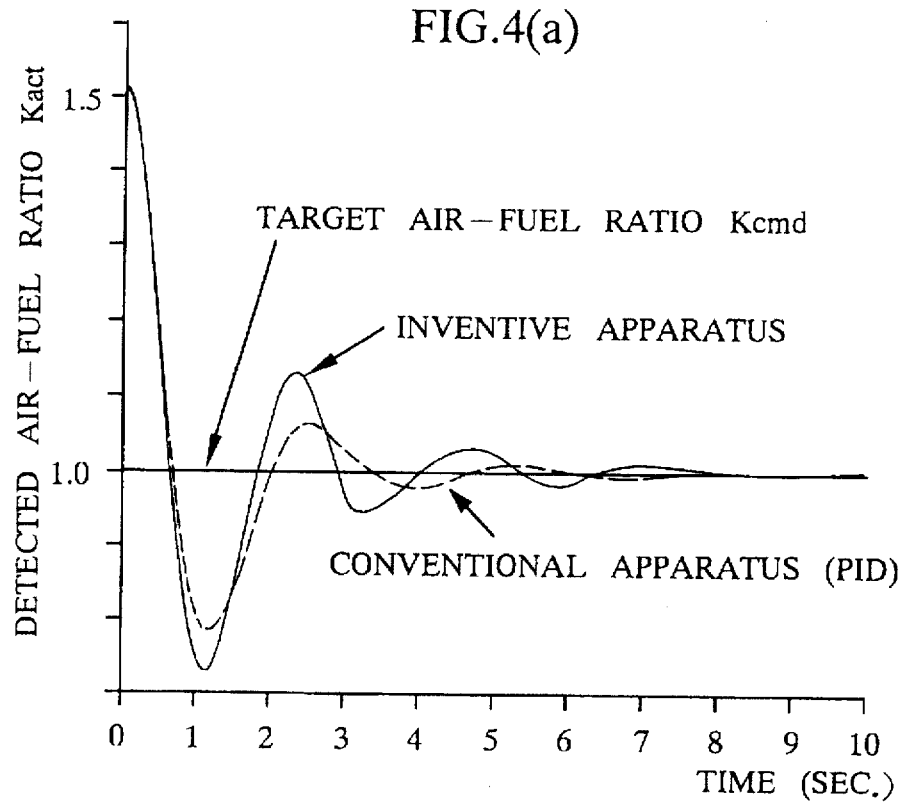
FIG. 4(a) is a diagram showing the results of simulations effected on the apparatus shown in FIG. 1 and a conventional apparatus.

Study of FIG. 4(a) reveals that the detected air-fuel ratio Kact was converged toward the target air-fuel ratio Kcmd substantially in the same manner by both the inventive and conventional apparatus.

Then, the inventor carried out a simulation, similar to the above simulation on the inventive apparatus, with the value "Cd" in the engine plant 1 modeled as shown in FIG. 2(b) being greater than the value in the above simulation, while keeping the matrixes A, B, S and the values of $\eta$, $\beta$ unchanged in the equation (9). The inventor also effected a similar simulation on the conventional PID control apparatus without changing the feedback gain, etc. The results of the simulations are indicated by the solid- and broke-line curves, respectively, in FIG. 4(b).

Figure 4B:
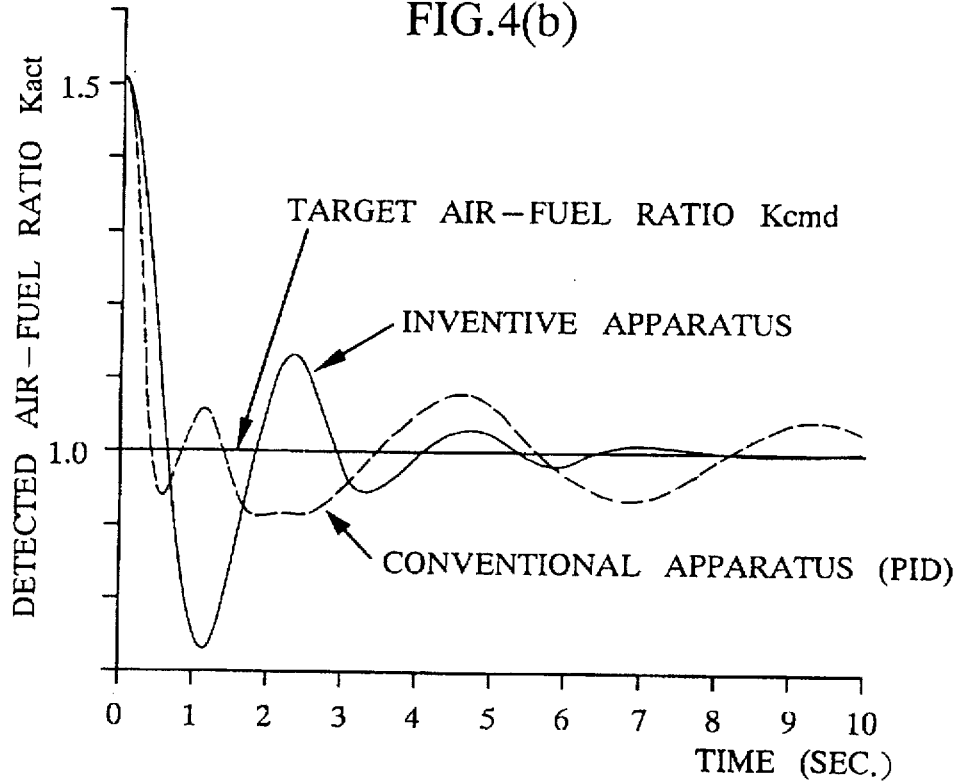
FIG. 4(b) is a diagram showing the results of other simulations effected on the apparatus shown in FIG. 1 and the conventional apparatus.

As shown in FIG. 4(b), the ability to converge the detected air-fuel ratio Kact toward the target air-fuel ratio Kcmd is maintained, as with FIG. 4(a), according to the sliding mode control process in this embodiment. However, the ability to converge the detected air-fuel ratio toward the target air-fuel ratio is lower with the conventional PID control apparatus.

It can thus be seen that the apparatus for controlling the air-fuel ratio of the engine 1 according to this embodiment can control the air-fuel ratio so as to converge the detected air-fuel ratio Kact stably toward the target air-fuel ratio Kcmd regardless of changes in the response of the fuel supply device of the engine 1, the air-fuel ratio sensor, etc.

An apparatus for controlling the air-fuel ratio of an internal combustion engine according to a second embodiment of the present invention will be described below with reference to FIGS. 5 and 6. The apparatus according to the second embodiment has its major components similar to those of the apparatus according to the first embodiment. Those parts of the apparatus according to the second embodiment which are identical to those of the apparatus according to the first embodiment are denoted by identical reference numerals, and will not be described in detail below.

Figure 5:
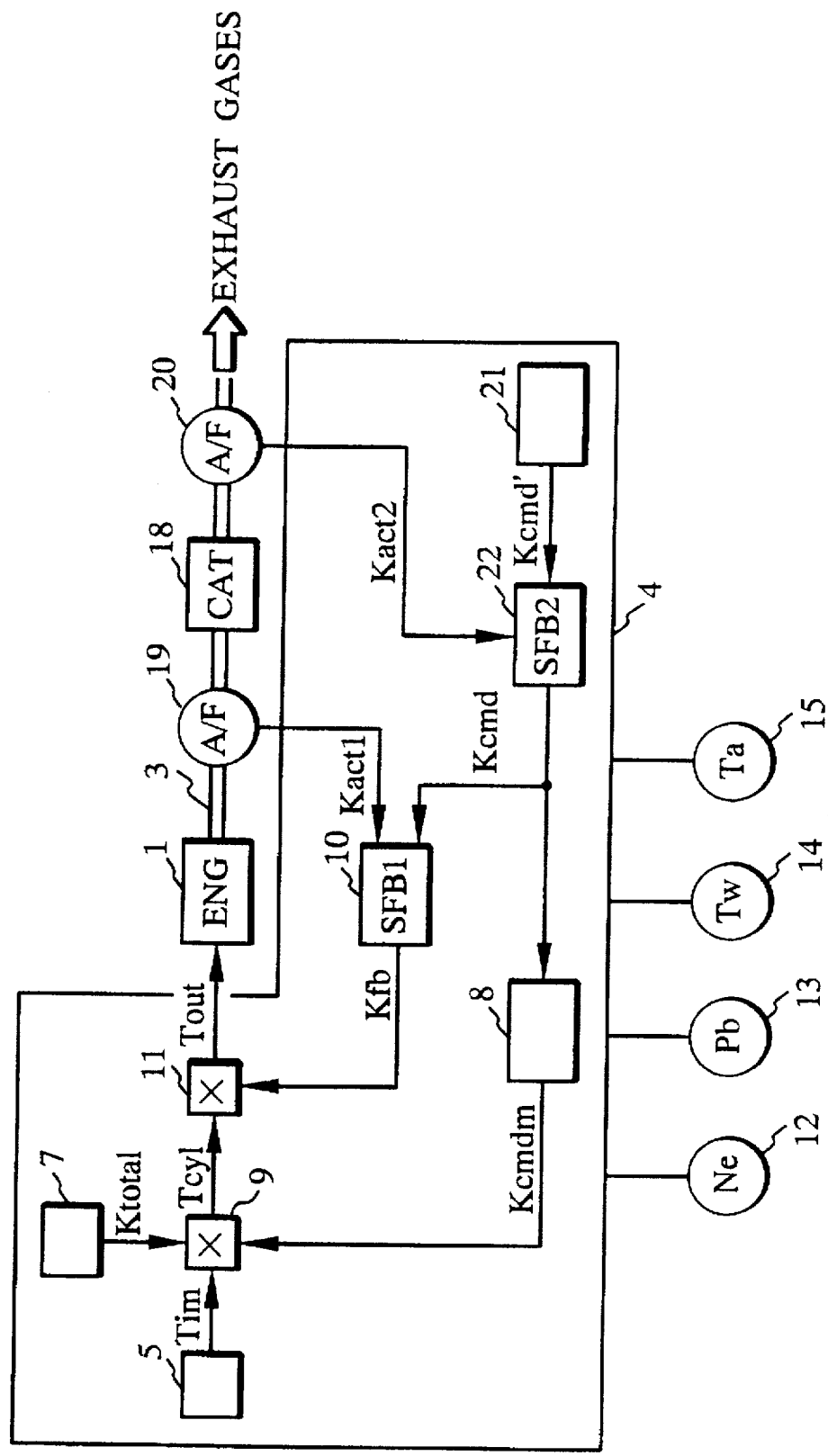
FIG. 5 is a block diagram of an apparatus for controlling the air-fuel ratio of an internal combustion engine according to a second embodiment of the present invention.

As shown in FIG. 5, an internal combustion engine 1 has an exhaust pipe 3 associated with a three-way catalytic converter 18 and two air-fuel ratio sensors 19, 20 which are positioned upstream and downstream, respectively, of the catalytic converter 18. A fuel supply control device 4 for controlling the amount of fuel supplied to the engine 1 has a target air-fuel-ratio calculating unit 21 for calculating a target air-fuel ratio Kcmd' downstream of the catalytic converter 18 based on a coolant temperature Tw, a rotational speed Ne, and an intake air pressure Pb of the engine 1, a feedback control unit (first feedback control means) 22 for determining, according to a sliding mode control process, a target air-fuel ratio Kcmd at the upstream air-fuel ratio sensor 19 to equalize an air-fuel ratio Kact2 detected by the downstream air-fuel ratio sensor 20 with the target air-fuel ratio Kcmd', and a feedback control unit (second feedback control means) 10, which is identical to the feedback control unit 10 according to the first embodiment, which is supplied with a target air-fuel ratio Kcmd and an air-fuel ratio Kact1 detected by the upstream air-fuel ratio sensor 19. Other structural details of the apparatus according to the second embodiment are identical to those of the apparatus according to the first embodiment.

The second corrective coefficient calculating unit 8 calculates a second corrective coefficient Kcmdm by correcting the target air-fuel ratio Kcmd determined by the feedback control unit 22.

The feedback control unit 10 determines, according to a sliding mode control process based to the equation (9), a feedback corrective coefficient Kfb from the target air-fuel ratio Kcmd and the air-fuel ratio Kact1 detected by the upstream air-fuel ratio sensor 19, in exactly the same manner as with the first embodiment.

The feedback control unit 22 determines the target air-fuel ratio Kcmd to be supplied to the feedback control unit 10, as follows:

In the sliding mode control process effected by the feedback control unit 22, an engine plant including the catalytic converter 18, the air-fuel ratio sensor 20, etc. is modeled as shown in FIGS. 2(a) and 2(b). Based on the model, the matrix S described above which is required for the sliding mode control process is determined, and the U(k) with overbar which prescribes a control quantity by the sliding mode control process is determined according to the same equation as the equation (8). The U(k) with overbar is determined in the same manner as with the first embodiment from the target air-fuel ratio Kcmd' determined by the target air-fuel-ratio calculating unit 21 and the detected air-fuel ratio Kact2 from the air-fuel ratio sensor 20.

The target air-fuel ratio Kcmd is determined as follows: A reference target air-fuel ratio at the air-fuel ratio sensor 19 is determined from a map or the like based on the coolant temperature Tw, the rotational speed Ne, and the intake air pressure Pb. Then, the reference target air-fuel ratio is corrected by being multiplied by a corrective coefficient (corresponding to the feedback corrective coefficient in the first embodiment. See the equation (9)) which is produced by adding 1 to the U(k) with overbar. The corrected reference target air-fuel ratio is produced as the target air-fuel ratio Kcmd.

Figure 6:
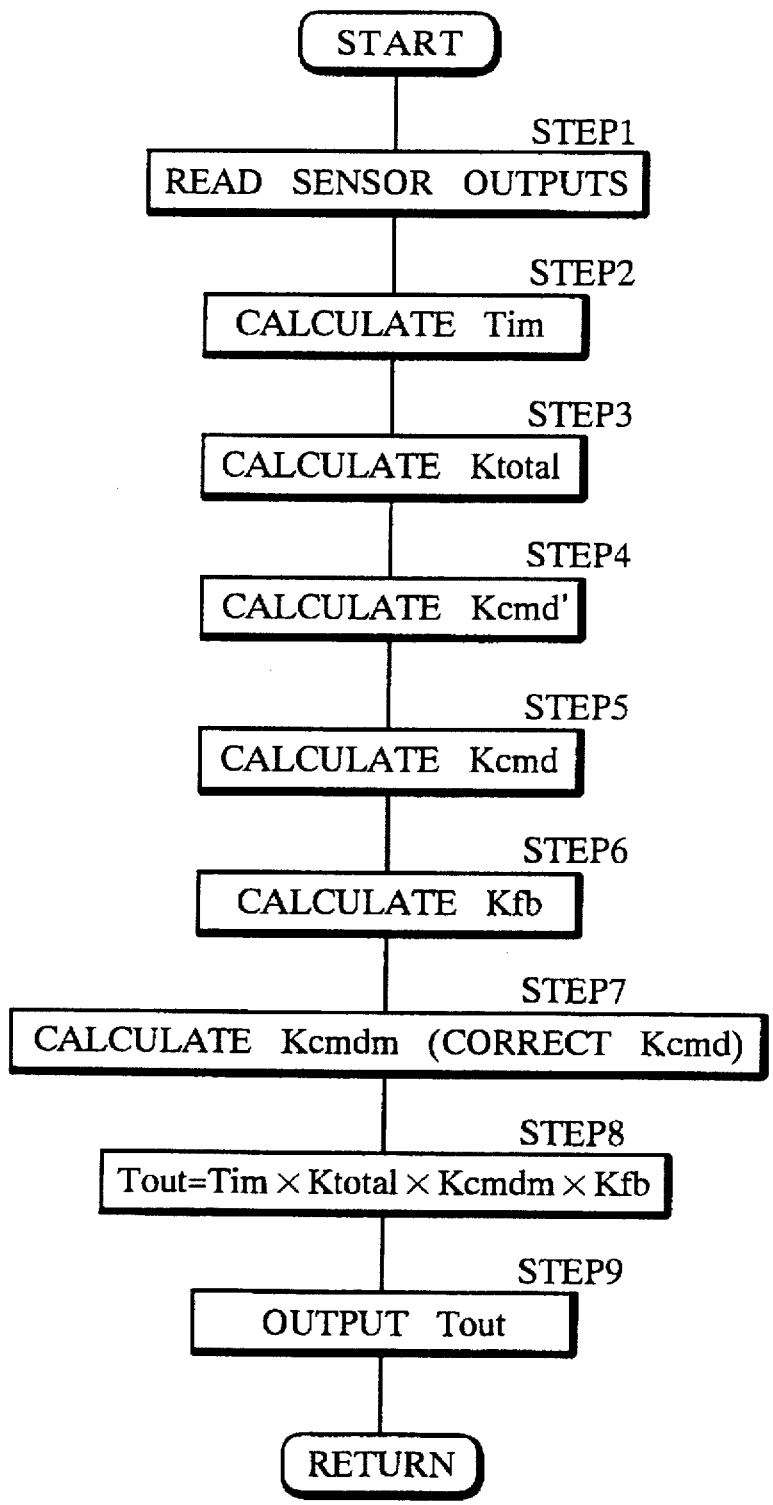
FIG. 6 is a flowchart of an operation sequence of the apparatus shown in FIG. 5.

The apparatus shown in FIG. 5 operates in cyclic periods according to an operation sequence shown in FIG. 6 for controlling the air-fuel ratio of the internal combustion engine 1.

As shown in FIG. 6, the fuel supply control device 4 reads detected output signals from the sensors 12~15 in a step 1, and the basic amount-of-fuel calculating unit 5, the target air-fuel-ratio calculating unit 21, and the first corrective coefficient calculating unit 7 calculate a basic amount Tim of fuel, a target air-fuel ratio Kcmd' at the air-fuel ratio sensor 20, and a first corrective coefficient Ktotal, respectively, based on the detected output signals in respective steps 2, 3, 4.

The feedback control unit 22 then determines, according to sliding mode control rules, a target air-fuel ratio Kcmd to be given to the feedback control unit 10 in order to equalize the detected air-fuel ratio Kact2 from the air-fuel ratio sensor 20 with the target air-fuel ratio Kcmd', from the detected air-fuel ratio Kact2 and the target air-fuel ratio Kcmd' in a step 5, and then determines a feedback corrective coefficient Kfb from the determined target air-fuel ratio Kcmd and the detected air-fuel ratio Kact1 from the air-fuel ratio sensor 19, in a step 6. The second corrective coefficient calculating unit 8 determines a second corrective coefficient Kcmdm in a step 7. The first and second multipliers 9, 11 multiply the basic amount Tim of fuel by the first and second corrective coefficients Ktotal, Kcmdm and the feedback corrective coefficient Kfb to determine an output amount Tout of fuel in a step 8. The output amount Tout of fuel thus determined is given as a command value to the non-illustrated fuel supply device in a step 9, and the fuel supply device supplies the indicated amount of fuel to the engine 1.

The air-fuel ratio of the engine 1 is thus controlled to equalize the detected air-fuel ratio Kact2 downstream of the catalytic converter 18 with the target air-fuel ratio Kcmd'.

The response characteristics of the catalytic converter 18 tend to vary due to aging. Since, however, the sliding mode control process is effected by the feedback control unit 22, the air-fuel ratio of the engine 1 can be controlled to equalize the detected air-fuel ratio Kact2 downstream of the catalytic converter 18 with the target air-fuel ratio Kcmd' with the same stable converging capability as with the first embodiment regardless of variations in the response characteristics of the catalytic converter 18.

In this embodiment, the sliding mode control process is effected by the feedback control unit 10. However, a conventional PID control process may be effected by the feedback control unit 10. Even with such an alternative arrangement, the air-fuel ratio downstream of the catalytic converter 18 can be controlled so as to be stably converged toward the target air-fuel ratio Kcmd' according to the sliding mode control process which is effected by the feedback control unit 22.

In each of the above embodiments, it has not been described to control the air-fuel ratio for each of the cylinders of a multicylinder engine. However, as proposed in Japanese patent application No. 6-340021, air-fuel ratios of the respective cylinders may be estimated from an air-fuel ratio detected by an air-fuel ratio sensor associated with an exhaust manifold of the engine, using an observer based on a model of an engine plant, and a corrective coefficient for correcting a command value for an output amount of fuel to be supplied to the engine with respect to each of the cylinders may be controlled by a feedback control loop according to a sliding mode control process in order to equalize the air-fuel ratios of the respective cylinders which have been estimated using the observer with respective target air-fuel ratios for the cylinders. Furthermore, a feedback control loop according to a sliding mode control process may be employed to determine a command value for an output amount of fuel to be supplied to the engine in order to equalize an air-fuel ratio in the exhaust manifold of the engine with a target air-fuel ratio. With such an arrangement, it is possible to adequately control the air-fuel ratios of the respective cylinders of the engine with stable converging capability even if errors of estimated air-fuel ratios of the cylinders are large due to aging of the air-fuel sensor.

Although certain preferred embodiments of the present invention have been shown and described in detail, it should be understood that various changes and modifications may be made therein without departing from the scope of the appended claims.

What is claimed is:

1. An apparatus for controlling the air-fuel ratio of an internal combustion engine, comprising:

air-fuel ratio detecting means for detecting an air-fuel ratio of the internal combustion engine; and fuel supply control means for controlling an amount of fuel supplied to the internal combustion engine based on the air-fuel ratio detected by said air-fuel ratio detecting means, said fuel supply control means comprising feedback control means for controlling the amount of fuel supplied to the internal combustion engine through a feedback control loop according to a sliding mode control process in order to equalize the detected air-fuel ratio with a target air-fuel ratio, wherein a hyperplane of said sliding mode control process is set up at least by two state quantities depending on the detected air-fuel ratio and the target air-fuel ratio.

2. An apparatus according to claim 1, wherein said fuel supply control means has means for determining an amount of fuel to be supplied to the internal combustion engine depending on at least a rotational speed and an intake air pressure of the internal combustion engine, and wherein said feedback control means has means for controlling the amount of fuel supplied to the internal combustion engine through the feedback control loop by correcting the amount of fuel to be supplied to the internal combustion engine according to the sliding mode control process in order to equalize the detected air-fuel ratio with said target air-fuel ratio.

3. An apparatus according to claim 1, further comprising a catalytic converter associated with an exhaust system of the internal combustion engine for purifying exhaust gases emitted from the internal combustion engine, said air-fuel ratio detecting means being positioned downstream of said catalytic converter.

4. An apparatus according to claim 1, wherein the two state quantities are determined by a difference between the detected air-fuel ratio and the target air-fuel ratio.

5. An apparatus for controlling the air-fuel ratio of an internal combustion engine, comprising:

air-fuel ratio detecting means for detecting an air-fuel ratio of the internal combustion engine; and fuel supply control means for controlling an amount of fuel supplied to the internal combustion engine based on the air-fuel ratio detected by said air-fuel ratio detecting means, said fuel supply control means comprising feedback control means for controlling the amount of fuel supplied to the internal combustion engine through a feedback control loop according to a sliding mode control process in order to equalize the detected air-fuel ratio with a target air-fuel ratio;

a catalytic converter associated with an exhaust system of the internal combustion engine for purifying exhaust gases emitted from the internal combustion engine, said air-fuel ratio detecting means being positioned downstream of said catalytic converter; and second air-fuel ratio detecting means positioned upstream of said catalytic converter, wherein said feedback control means comprises first feedback control means for determining a target air-fuel ratio upstream of said catalytic converter according to the sliding mode control process depending on an air-fuel ratio detected by the air-fuel ratio detecting means positioned downstream of said catalytic converter, and second feedback control means for controlling the amount of fuel supplied to the internal combustion engine through the feedback control Iccp in order to equalize an air-fuel ratio detected by the second air-fuel ratio detecting means positioned upstream of said catalytic converter with the target air-fuel ratio upstream of said catalytic converter which is determined by said first feedback control means.

6. An apparatus according to claim 5, wherein said first feedback control means comprises means for determining the target air-fuel ratio upstream of said catalytic converter by correcting a reference target air-fuel ratio upstream of said catalytic converter according to the sliding mode control process in order to equalize the air-fuel ratio detected by the air-fuel ratio detecting means positioned downstream of said catalytic converter with a target air-fuel ratio downstream of said catalytic converter.

7. An apparatus according to claim 5, wherein said second feedback control means comprises means for controlling the amount of fuel supplied to the internal combustion engine through the feedback control loop according to the sliding mode control process.

8. An apparatus according to claim 7, wherein said fuel supply control means has means for determining an amount of fuel to be supplied to the internal combustion engine depending on at least a rotational speed and an intake air pressure of the internal combustion engine, and wherein said second feedback control means has means for controlling the amount of fuel supplied to the internal combustion engine through the feedback control loop by correcting the amount of fuel to be supplied to the internal combustion according to the sliding mode control process in order to equalize the air-fuel ratio detected upstream of said catalytic converter with the target air-fuel ratio determined by said first feedback control means.

\* \* \* \* \*

UNITED STATES PATENT AND TRADEMARK OFFICE
CERTIFICATE OF CORRECTION

PATENT NO. : 5,694,910

DATED : December 9, 1997

INVENTOR(S) : Hasegawa

It is certified that error appears in the above-identified patent and that said Letters Patent is hereby corrected as shown below:

```
Claim 5, column 14, line 3, please delete "Iccp" insert
therefor -- loop --
```

Signed and Sealed this

Twenty-fourth Day of February, 1998

Attest:

BRUCE LEHMAN

*Attesting Officer*  *Commissioner of Patents and Trademarks*